United States Patent
McGettigan et al.

(10) Patent No.: US 10,847,954 B1
(45) Date of Patent: Nov. 24, 2020

(54) TEMPORARY DIRECT CURRENT POWER SYSTEM

(71) Applicant: Faith Technologies, Inc., Menasha, WI (US)

(72) Inventors: Patrick Jon McGettigan, Franklin, TN (US); Michael Martin Driscoll, Greenville, WI (US); Jody David Seubert, Appleton, WI (US)

( * ) Notice: Subject to any disclaimer, the term of this patent is extended or adjusted under 35 U.S.C. 154(b) by 0 days.

(21) Appl. No.: 16/386,546

(22) Filed: Apr. 17, 2019

(51) Int. Cl.
| H02B 1/52 | (2006.01) |
| H02B 1/30 | (2006.01) |
| H02M 7/00 | (2006.01) |
| H02B 1/20 | (2006.01) |
| H02B 1/04 | (2006.01) |

(52) U.S. Cl.
CPC ............... H02B 1/52 (2013.01); H02B 1/04 (2013.01); H02B 1/202 (2013.01); H02B 1/30 (2013.01); H02M 7/003 (2013.01)

(58) Field of Classification Search
CPC . H02B 1/04; H02B 1/202; H02B 1/30; H02B 1/52; H02M 7/003
See application file for complete search history.

(56) References Cited

U.S. PATENT DOCUMENTS

| 9,086,447 | B1 | 7/2015 | Ledbetter, III et al. | |
| 9,212,499 | B1* | 12/2015 | Maurer | E04H 5/04 |
| 9,231,491 | B2 | 1/2016 | Benson et al. | |
| 10,090,703 | B2 | 10/2018 | Merkel et al. | |
| 2007/0230094 | A1* | 10/2007 | Carlson | H02B 1/52 361/625 |
| 2009/0109605 | A1* | 4/2009 | Blake | H02B 1/52 361/625 |
| 2009/0268380 | A1* | 10/2009 | Brown | H02B 1/52 361/625 |
| 2010/0103592 | A1* | 4/2010 | Neumann | H02B 1/52 361/625 |
| 2014/0160686 | A1* | 6/2014 | Benson | H02M 7/003 361/724 |
| 2015/0171632 | A1* | 6/2015 | Fry | H02J 7/0004 307/22 |
| 2017/0207607 | A1* | 7/2017 | Lee | H02B 1/308 |
| 2018/0254616 | A1* | 9/2018 | Murray | H04L 12/10 |
| 2018/0294982 | A1* | 10/2018 | Boemi | H04L 12/10 |
| 2018/0316163 | A1* | 11/2018 | Jung | H02B 1/24 |

FOREIGN PATENT DOCUMENTS

| JP | 2009159651 A | 7/2009 |
| WO | 2009081912 A1 | 7/2009 |

* cited by examiner

*Primary Examiner* — Jacob R Crum
(74) *Attorney, Agent, or Firm* — Randall W. Fieldhack

(57) ABSTRACT

A power supply system includes an input structure configured to receive AC power; an AC-to-DC power converter in electrical communication with the input structure; a breaker panel including a plurality of breakers, wherein the AC-to-DC power converter is configured to supply DC power to the breaker panel; a plurality of receptacles, wherein each receptacle is in electrical communication with a breaker such that a breaker controls power to an associated receptacle; and a transport structure configured to facilitate portability of the power supply system.

20 Claims, 3 Drawing Sheets

TEMPORARY DIRECT CURRENT POWER SYSTEM

BACKGROUND

Many buildings and other facilities require the installation and use of switchgear in their electrical systems. Because of their typical size and locations, switchgear can be installed early in the construction process. Such timing, however, can preclude the energizing and testing of the switchgear to commission the switchgear because adequate and appropriate power supplies have not yet been installed or connected. 480 volt alternating current (VAC) is often available on a construction site, but the 130 volt direct current (VDC) needed to energize the controls of switchgear is not. Installers are thereby forced to wait until the needed power is made available, often making commissioning the switchgear a critical path item later in construction.

This is further complicated by the typical installation of multiple switchgear. If earlier testing is required, a temporary DC power source incorporating an AC-to-DC converter is required to be supplied, often as a rental item. To commission, for example, twenty switchgear, the installer would either need twenty converter units to commission the switchgear in parallel, or fewer converter units with commissioning done serially. Either method requires significant resources.

SUMMARY

The present disclosure solves these issues by providing a temporary DC power system to which multiple switchgear can be connected for concurrent commissioning. The temporary DC power system can be placed at any time during construction, enabling the switchgear to be commissioned off critical path. In addition, use of the temporary DC power system enables one installer to energize, test, and commission multiple switchgear simultaneously. The temporary DC power system is then easily removed for use at another location.

In one aspect, the present disclosure provides a power supply system including an input structure configured to receive AC power; an AC-to-DC power converter in electrical communication with the input structure; a breaker panel including a plurality of breakers, wherein the AC-to-DC power converter is configured to supply DC power to the breaker panel; a plurality of receptacles, wherein each receptacle is in electrical communication with a breaker such that a breaker controls power to an associated receptacle; and a transport structure configured to facilitate portability of the power supply system.

In another aspect, the present disclosure provides a power supply system including an input structure configured to receive AC power; an AC-to-DC power converter in electrical communication with the input structure; a breaker panel including a plurality of breakers, wherein the AC-to-DC power converter is configured to supply DC power to the breakers in the breaker panel; a plurality of receptacles, wherein each receptacle is in electrical communication with a breaker such that a breaker controls power to an associated receptacle, wherein the breaker panel includes one breaker per receptacle, wherein each receptacle is configured to accept a removable output cable, and wherein the system includes at least five receptacles and at least five breakers; and a transport structure configured to facilitate portability of the power supply system.

In an alternate aspect of the present disclosure, a power supply system includes an input structure configured to receive AC power, wherein the input structure is a disconnect, and wherein the input structure includes a connector for removably attaching a supply cable; an AC-to-DC power converter in electrical communication with the input structure; a breaker panel including a plurality of breakers, wherein the AC-to-DC power converter is configured to supply DC power to the breakers in the breaker panel; a plurality of receptacles, wherein each receptacle is in electrical communication with a breaker such that a breaker controls power to an associated receptacle, wherein the breaker panel includes one breaker per receptacle, wherein each receptacle is configured to accept a removable output cable, and wherein the system includes at least five receptacles and at least five breakers; and a transport structure configured to facilitate portability of the power supply system, wherein the transport structure is a skid.

BRIEF DESCRIPTION OF THE DRAWINGS

The foregoing and other features and aspects of the present disclosure and the manner of attaining them will become more apparent, and the disclosure itself will be better understood by reference to the following description, appended claims and accompanying drawings, where:

Figure 1:
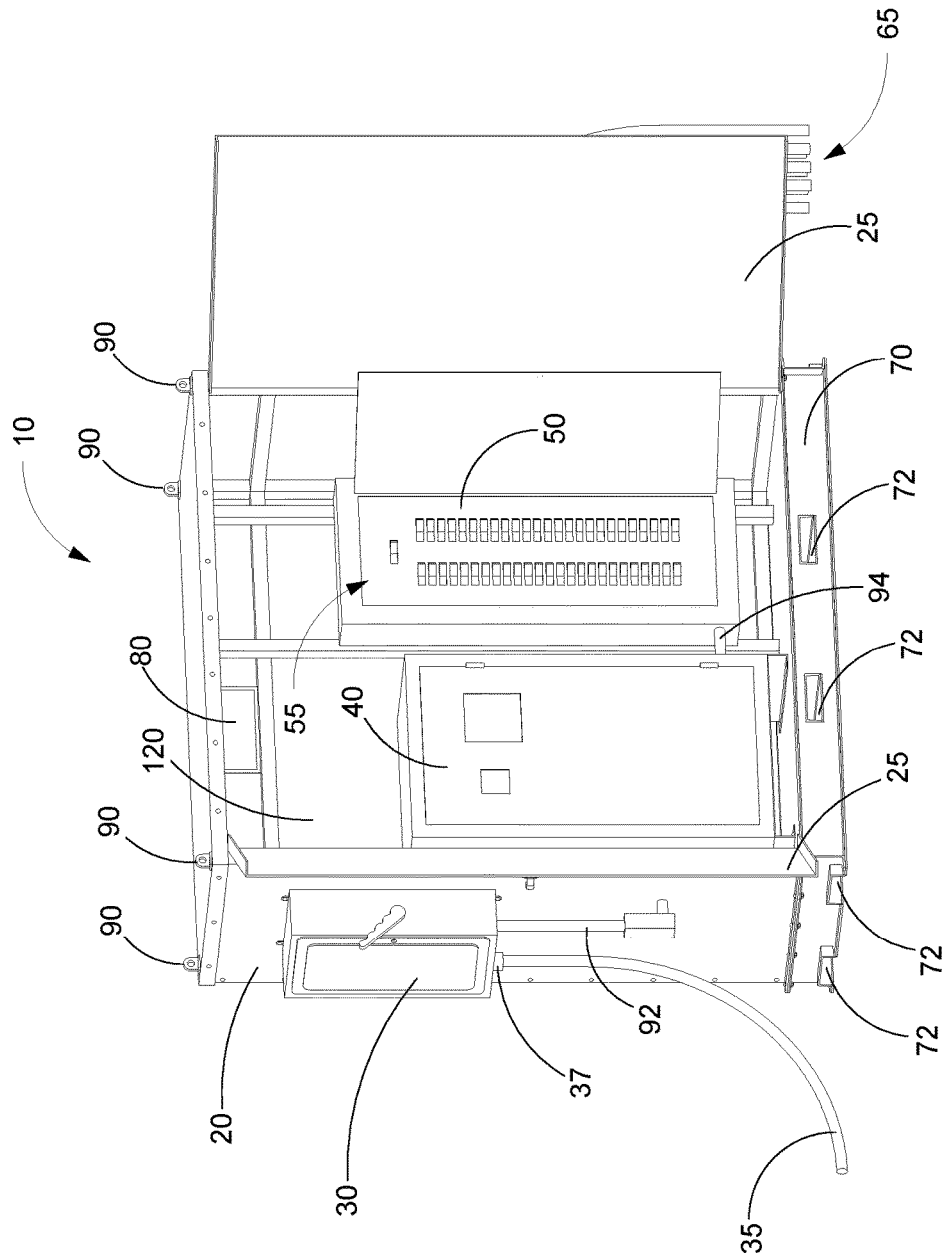
FIG. 1 representatively illustrates a simplified perspective view of the temporary DC power system of the present disclosure.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

Reference now will be made in detail to various aspects of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one aspect, can be used on another aspect to yield a still further aspect. Thus, it is intended that the present disclosure covers such modifications and variations as come within the scope of the appended claims and their equivalents.

Generally speaking, the present disclosure is directed to a portable power supply system to be used on a construction site for early commissioning of switchgear prior to installation of key electrical equipment. The power supply system converts 480 VAC site power to the 130 VDC power needed to energize and test the control side of switchgear. In one example, DC power is needed to wind up springs in the switchgear to test knife switches. In other examples, DC power is needed to test all control wiring in the switchgear and anything else that runs on DC power.

Figure 2:
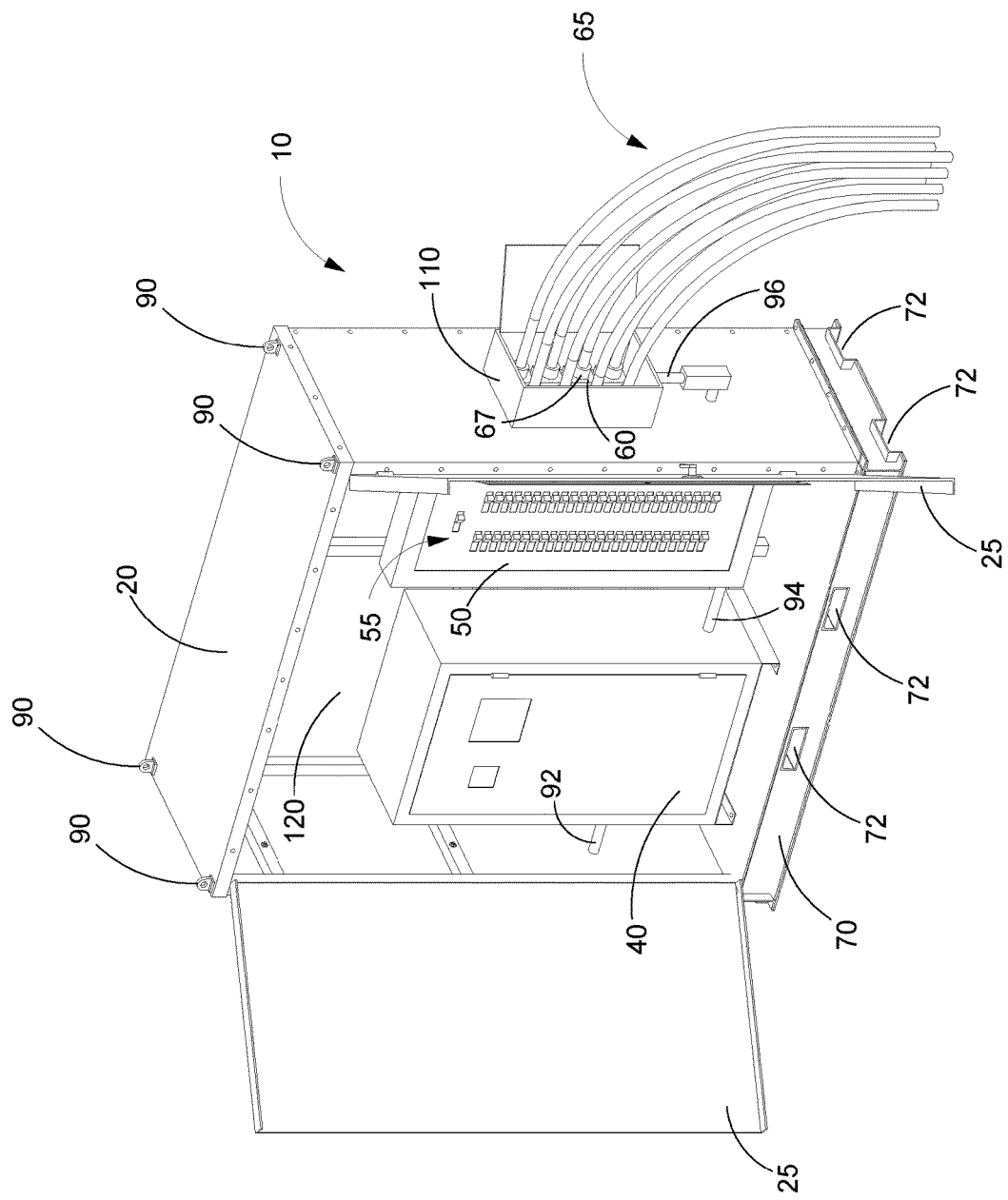
FIG. 2 representatively illustrates an alternative simplified perspective view of the temporary DC power system of FIG. 1.
Figure 3:
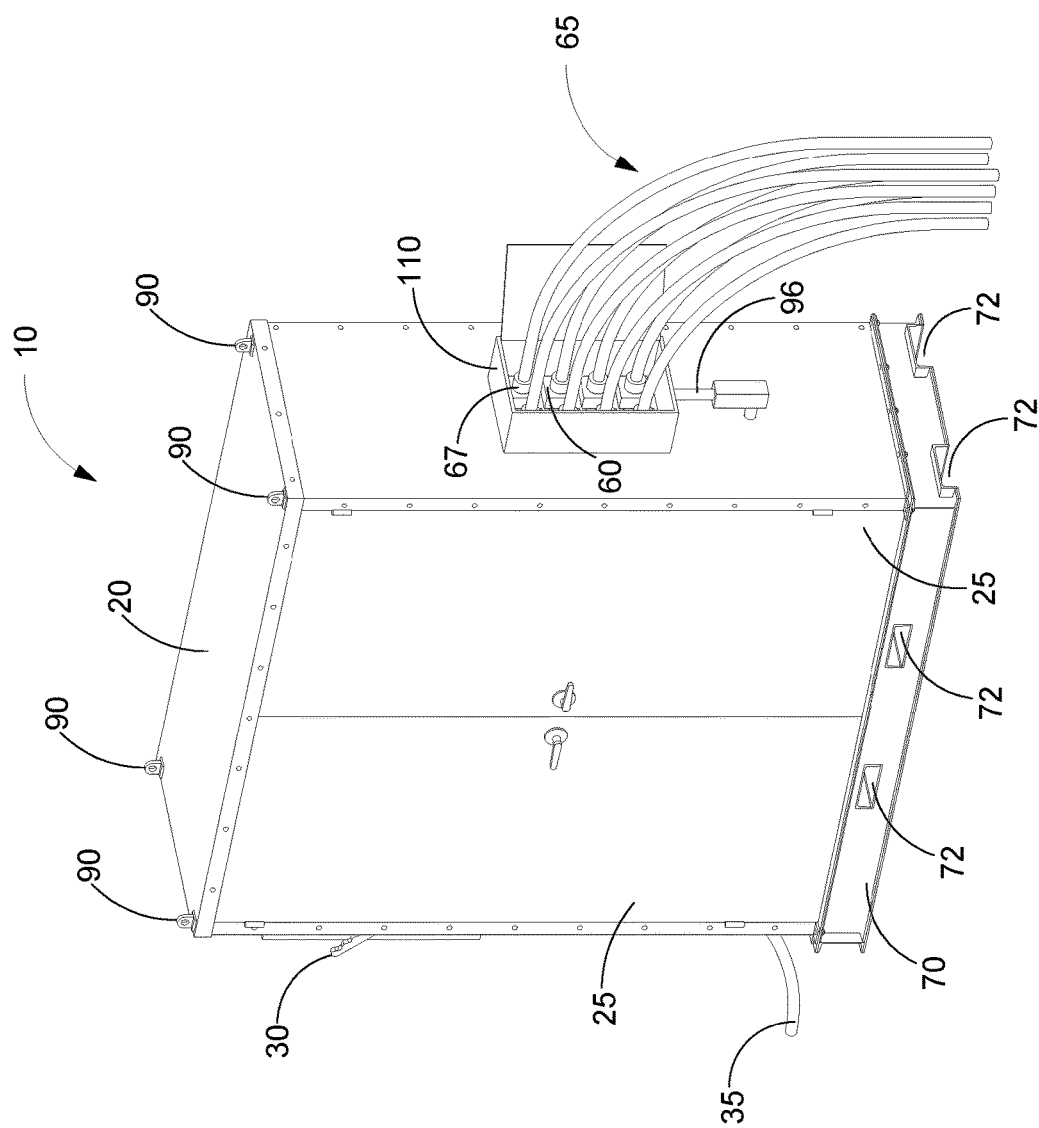
FIG. 3 representatively illustrates an alternative simplified perspective view of the temporary DC power system of FIG. 1.

As illustrated in FIGS. 1-3, a portable power supply system 10 includes a cabinet 20, an electrical input structure 30, an AC-to-DC power converter 40, a breaker panel 50, and a plurality of receptacles 60. The power supply system 10 includes a transport structure 70 configured to facilitate the portability of the power supply system 10. The power supply system 10 can include one or more environmental control units 80 to maintain the internal environment of the cabinet 20 in a desired range. The power supply system 10 can also include a plurality of power cables 65 to connect the plurality of receptacles 60 to a plurality of switchgear.

In a basic schematic sense, electrical power is supplied to the power supply system 10 from construction site or other power source, typically at 480 VAC. A disconnect or other electrical input structure 30 places the power source in electrical communication with an AC-to-DC power converter 40. The AC-to-DC power converter 40 is in electrical communication with a breaker panel 50 including a plurality of DC breakers 55. In a typical arrangement, each breaker 55 in the breaker panel 50 is in electrical communication with a receptacle 60, thereby providing DC power to the receptacles 60 usable by authorized personnel.

Turning to FIGS. 1 and 3, the cabinet 20 of the power supply system 10 can be a standard cabinet or enclosure used in the electrical construction industry or any suitable cabinet or enclosure capable of containing the components of the power supply system 10 without exposing the components to the exterior environment or to any unwanted access. Such cabinets are typically rectilinear and sized to accommodate the desired components placed within. The cabinet 20 can include one or more doors 25 to allow personnel access for installation or maintenance purposes. Such doors 25 can be lockable to limit unauthorized or inadvertent access.

The power supply system 10 includes an electrical input structure 30. The electrical input structure 30 provides the interface between a construction site or other power source and the power supply system 10. The electrical input structure 30 includes a mechanism to accept a supply cable 35 carrying electrical power from the construction site or other power source. The supply cable 35 can be hard-wired in the electrical input structure 30, the supply cable 35 can be connected using any suitable plug 37 and receptacle configuration, or the supply cable 35 can be connected by any other suitable method. The electrical input structure 30 can be or can include a disconnect to control flow of power to the power supply system 10. The electrical input structure 30 can be mounted to the exterior of the cabinet 20 as shown in FIG. 1, in the interior of the cabinet 20, or in a combination of the two where the electrical input structure 30 is integral with the cabinet 20 but accessible from the exterior of the cabinet 20. The input structure 30 can include a connector 37 for removably attaching a supply cable 35. The connector 37 can be a cam lock connector, a free-moving mechanical lug connector such as those available from Polaris Electrical Connectors, or any other suitable connector. Connectors and other hardware described herein need to meet national and local electrical code requirements. A suitable electrical input structure 30 in some applications is a SQUARE D H363RB heavy duty safety switch available from Schneider Electric. In other aspects of the present disclosure, the connector can be disposed in a box or other structure separate from the input structure 30. The input structure 30 is electrically connected to the AC-to-DC power converter 40 via conduit 92 or by any other suitable connection structure.

The power supply system 10 includes an AC-to-DC power converter 40. The AC-to-DC power converter 40 is in electrical communication with the electrical input structure 30 to receive AC power and with the breaker panel 50 to supply DC power. In one aspect of the present disclosure, the AC-to-DC power converter 40 receives 480 VAC power from the construction site or other power source via the electrical input structure 30. In this aspect, the AC-to-DC power converter 40 converts the 480 VAC power to 130 VDC and transmits that to the breaker panel 50 via a cable, bus bar, or other suitable connector 100. A suitable AC-to-DC power converter 40 in some applications is the model AT30-130-200 stationary float battery charger available from HindlePower Inc. The AC-to-DC power converter 40 is electrically connected to the breaker panel 50 via conduit 94 or by any other suitable connection structure.

The power supply system 10 also includes a breaker panel 50. The breaker panel 50 is in electrical communication with the output of the AC-to-DC power converter 40 via the cable, bus bar, or other suitable connector 100. The breaker panel 50 includes a plurality of DC breakers 55 in electrical communication with the output of the AC-to-DC power converter 40. The breaker panel 50 can include one, two, five, ten, 20, 50, or any suitable number of breakers 55. The breakers 55 in the breaker panel 50 are typically wired in parallel. The breakers 55 act to protect each connection and downstream piece of equipment in case problems arise in use. A suitable breaker panel 50 in some applications is a model HCM32738 I-Line power distribution panelboard available from Schneider Electric. A suitable DC breaker 55 in some applications is a 600V 20A SQUARE D HDA260202 molded case circuit breaker available from Schneider Electric. The breakers 55 are electrically connected to the receptacles 60 via a conduit 96 or by any other suitable connection structure.

The power supply system 10 also includes a plurality of receptacles 60. Each receptacle is in electrical communication with a breaker 55 in the breaker panel 50. DC power received by the breaker panel 50 from the AC-to-DC power converter 40 is distributed via parallelly-wired breakers 55 to the plurality of receptacles 60. Each breaker 55 is preferably wired to control a single receptacle 60, although each breaker 55 can be configured to supply one or more receptacles 60. The power supply system 10 can include one, two, five, ten, 20, 50, or any suitable number of receptacles 60. FIGS. 2 and 3 show eight receptacles 60 to demonstrate the concept while maintaining clarity in the illustration. The number of receptacles 60 typically but not necessarily matches the number of breakers 55 in the breaker panel 50. Each receptacle 60 can be of any suitable design and arrangement. The receptacles 60 can all be identical, or different receptacle designs and arrangements can be provided. A suitable receptacle 60 in some applications is a pin and sleeve model HBL360R6 W receptacle available from Hubbell Inc.

In one aspect of the present disclosure, each receptacle 60 is configured to accept an output cable 65 having a plug 67 compatible with the receptacle 60. FIGS. 2 and 3 show eight output cables 65 to demonstrate the concept while maintaining clarity in the illustration. A suitable plug 67 in some applications is a pin and sleeve model HBL360P6 W plug available from Hubbell Inc. In another aspect of the present disclosure, the power supply system 10 can include one or more output cables 65 in direct electrical communication with a breaker 55 without the use of a receptacle. In either of these aspects, the power supply system 10 can include one or more cable reels (not shown) providing a retractable output cable 65 in electrical communication with a receptacle 60 or directly with a breaker 55 without the use of a receptacle. The retractable output cable 65 can be pulled from the cabinet 20 to provide power to a switchgear, and then retracted back on its cable reel when no longer needed.

The receptacles 60 can be mounted in the cabinet 20 itself or in a receptacle box 110. The receptacle box 110, if present, can be mounted to the exterior of the cabinet 20 as shown in FIGS. 2 and 3, in the interior of the cabinet 20, or in a combination of the two where the receptacle box 110 is integral with the cabinet 20 and the receptacles 60 are accessible from the exterior of the cabinet 20. A suitable receptacle box 110 in some applications is a typical electrical box such as those available from Saginaw Control and Engineering and from nVent Hoffman.

The cabinet 20 can include storage space 120 and/or storage hardware to accommodate storage of any cables. The presence of cables within the cabinet 20 allows the power supply system 10 to be used immediately upon placement without the need to obtain cables from a separate source. Such storage space 120 and/or storage hardware can be interior or exterior to the cabinet 20.

The power supply system 10 also includes a transport structure 70 configured to facilitate the portability of the power supply system 10. The transport structure 70 can be a skid, a structural platform on which the cabinet 20 is disposed. A skid typically includes passageways 72 to accommodate the forks of a forklift to allow the power supply system 10 to be moved. In other aspects, the transport structure 70 can include casters or wheels (not shown), with or without a skid, to allow the power supply system 10 to be rolled to a different location. The power supply system 10 can alternatively or additionally include lifting lugs 90 attached to the cabinet 20 to facilitate movement of the power supply system 10 by crane or other overhead lifting device.

The power supply system 10 can include one or more environmental control units 80 to maintain the internal environment of the cabinet 20 in a desired range. Depending on the intended placement of the power supply system 10, the environment control units 80 can include heaters, cooling units, humidity control units, and/or any other suitable sensor, monitoring, and control hardware and software. A suitable environmental control unit 80 in some applications can be a fan or an environmental control unit such as the model SCE-AC3400B230V available from Saginaw Control and Engineering.

The power supply system 10 can include any other suitable sensor, monitoring, and control hardware and software needed to maintain and optimize operation of the power supply system 10.

In use, the power supply system 10 is delivered to a site and positioned near switchgear in need of testing and commissioning. AC site power is connected to the electrical input structure 30 of the power supply system 10. The AC-to-DC power converter 40 converts the AC power to DC power, which is supplied to the breakers 55 in the breaker panel 50. Each breaker 55 when closed supplies power to at least one receptacle 60. Each breaker 55 can also be used to interrupt power to its associated receptacle or receptacles 60. Each receptacle 60 can be used to supply DC power to a switchgear via a removably-connected or otherwise-configured cable 65. Multiple switchgear can be tested simultaneously, as many switchgear as there are receptacles 60 and cables 65. Once testing is completed, the cables 65 can be disconnected and the power supply system 10 can be removed, to eventually be replaced if needed by more permanent structure.

The power supply system 10 of the present disclosure allows for the simultaneous commissioning of as many switchgear as there are receptacles 60 and cables 65. Such commissioning can be done off critical path because it can be done before permanent systems are in place. One such power supply system 10 replaces multiple individual test machines, saving rental costs and the time required to transport and connect multiple test machines. Also, reducing the number of connections to be made and eliminating the need for individual test machines of potentially-questionable provenance reduces time and manpower and increases safety.

While the disclosure has been described in detail with respect to specific aspects thereof, it will be appreciated that those skilled in the art, upon attaining understanding of the foregoing will readily appreciate alterations to, variations of, and equivalents to these aspects. Accordingly, the scope of the present disclosure should be assessed as that of the appended claims and any equivalents thereto. Additionally, all combinations and/or sub-combinations of the disclosed aspects, ranges, examples, and alternatives are also contemplated.

What is claimed:

1. A portable power supply system comprising:
    an input structure configured to receive AC power;
    an AC-to-DC power converter in electrical communication with the input structure;
    a breaker panel including a plurality of breakers, wherein the AC-to-DC power converter is configured to supply DC power to the breaker panel;
    a plurality of receptacles, wherein each receptacle is in electrical communication with a breaker of the plurality of breakers such that a breaker controls power to an associated receptacle; and
    a transport structure configured to facilitate portability of the power supply system.

2. The power supply system of claim 1, wherein the input structure is a disconnect.

3. The power supply system of claim 1, wherein the breaker panel includes one breaker per receptacle.

4. The power supply system of claim 1, wherein each receptacle is configured to accept a removable cable.

5. The power supply system of claim 1, wherein the transport structure is a skid.

6. The power supply system of claim 1, further comprising an environmental control unit.

7. The power supply system of claim 1, wherein the input structure includes a connector for removably attaching a supply cable.

8. The power supply system of claim 1, wherein the system includes at least five receptacles and at least five breakers.

9. The power supply system of claim 1, wherein the system includes at least ten receptacles and at least ten breakers.

10. The power supply system of claim 1, wherein the system includes at least twenty receptacles and at least twenty breakers.

11. The power supply system of claim 1, the system further comprising an output cable for each receptacle.

12. The power supply system of claim 11, wherein each output cable includes a connector compatible with a receptacle.

13. A portable power supply system comprising:
    an input structure configured to receive AC power;
    an AC-to-DC power converter in electrical communication with the input structure;

a breaker panel including a plurality of breakers, wherein the AC-to-DC power converter is configured to supply DC power to the breakers in the breaker panel;

a plurality of receptacles, wherein each receptacle is in electrical communication with a breaker of the plurality of breakers such that a breaker controls power to an associated receptacle, wherein the breaker panel includes one breaker per receptacle, wherein each receptacle is configured to accept a removable output cable, and wherein the system includes at least five receptacles and at least five breakers; and a transport structure configured to facilitate portability of the power supply system.

14. The power supply system of claim 13, wherein the transport structure is a skid.

15. The power supply system of claim 13, wherein the input structure includes a connector for removably attaching a supply cable.

16. The power supply system of claim 13, wherein the system includes at least ten receptacles and at least ten breakers.

17. The power supply system of claim 13, wherein the system includes at least twenty receptacles and at least twenty breakers.

18. A portable power supply system comprising:

an input structure configured to receive AC power, wherein the input structure is a disconnect, and wherein the input structure includes a connector for removably attaching a supply cable;

an AC-to-DC power converter in electrical communication with the input structure;

a breaker panel including a plurality of breakers, wherein the AC-to-DC power converter is configured to supply DC power to the breakers in the breaker panel;

a plurality of receptacles, wherein each receptacle is in electrical communication with a breaker of the plurality of breakers such that a breaker controls power to an associated receptacle, wherein the breaker panel includes one breaker per receptacle, wherein each receptacle is configured to accept a removable output cable, and wherein the system includes at least five receptacles and at least five breakers; and a transport structure configured to facilitate portability of the power supply system, wherein the transport structure is a skid.

19. The power supply system of claim 18, wherein the system includes at least ten receptacles and at least ten breakers.

20. The power supply system of claim 18, wherein the system includes at least twenty receptacles and at least twenty breakers.

* * * * *